Figure 1:
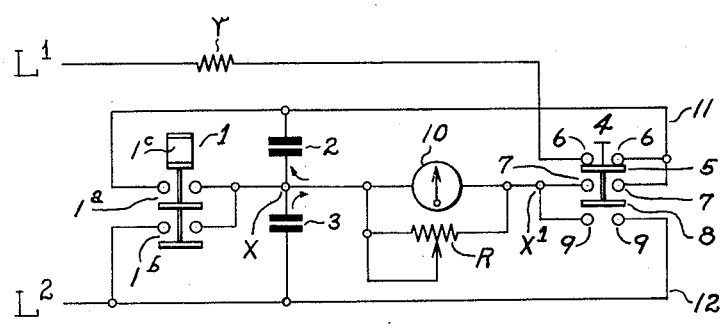

Sept. 2, 1952  W. H. ELLIOT  2,609,424

CAPACITOR CONTROL

Filed June 30, 1947

Inventor
William H. Elliot
By [signature]
Attorney

Patented Sept. 2, 1952

2,609,424

UNITED STATES PATENT OFFICE 2,609,424

CAPACITOR CONTROL

William H. Elliot, Shorewood, Wis., assignor to Cutler-Hammer, Inc., Milwaukee, Wis., a corporation of Delaware Application June 30, 1947, Serial No. 757,976

6 Claims. (Cl. 175—183)

This invention relates to capacitor control and involves novel use of series related capacitors.

The invention has various advantageous applications including that of facilitating test of simultaneity of operation of a plurality of sets of contacts.

The objects of the invention include that of obtaining as a function of simultaneous operation of a plurality of sets of contacts like charges of series connected capacitors, and as a function of non-simultaneous operation of the contacts unlike charges of the capacitors.

Another object is to obtain indication by the degree of difference between the charges of the capacitors of the extent of departure from simultaneity of operation of the sets of contacts.

Another object is to provide an improved circuit having utility for correctional as well as for detecting and indicating purposes.

Other objects and advantages of the invention will hereinafter appear.

The accompanying drawing illustrates certain embodiments of the invention which will now be described, it being understood that the embodiments illustrated are susceptible of modification without departing from the scope of the appended claims.

Figure 2:
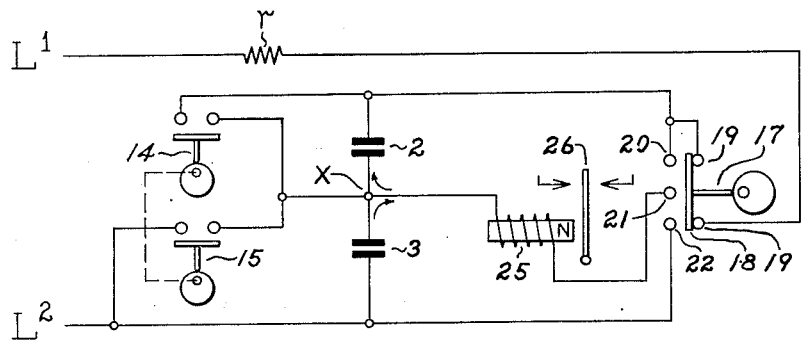

In the drawing,

Figure 1 shows a simple circuit for testing simultaneity of operation of sets of contacts operated by a single electromagnet, and Fig. 2 shows a circuit utilized for testing simultaneity of operation of cam operated contacts and including an instrumentality having utility for correctional purposes as well as for indicating purposes.

Referring to Fig. 1, the same shows a conventional form of electromagnetic switch 1 comprising normally disengaged sets of contacts $1^a$ and $1^b$ to be engaged simultaneously by an electromagnet $1^c$. As will be understood, this form of switch has merely been selected for simplicity of illustration, it being apparent that the sets of contacts $1^a$ and $1^b$ might be provided with other operating means common thereto or with independent operating means.

Capacitors 2 and 3 of any preferred suitable type are arranged in series relation to be shunted respectively by the contacts $1^a$ and $1^b$. These series connected capacitors are alike and are connected across supply lines $L^1$ and $L^2$ through a suitable resistor $r$ and normally engaged contacts of a push button switch 4.

The push button switch 4 comprises a movable contact 5 normally bridging stationary contacts 6—6 and adapted to be moved out of engagement with said stationary contacts into bridging relation with stationary contacts 7—7. Further switch 4 comprises a movable contact 8 normally disengaged from but movable into bridging relation with stationary contacts 9—9. The switch 4 is so designed that the contacts 5 and 8 bridge contacts 7—7 and 9—9, respectively, substantially simultaneously.

An indicating meter 10 of conventional form is connected between a point X in the series connection of capacitors 2 and 3 and point $X^1$ to which the pairs of contacts 7 and 9 each have one contact connected. The meter 10 is shown as shunted by an adjustable rheostat R.

The switch 4 upon bridging contact 7—7 completes a shunt for capacitor 2 inclusive of meter 10, which shunt is completed by conductor 11 extending to capacitor 2 from the right hand contact 7. Also switch 4 upon bridging contacts 9 completes a shunt for capacitor 3 inclusive of meter 10, said shunt being completed by conductor 12 extending to capacitor 3 from the right hand contact 9.

Thus assuming switch 1 to be energized for engagement of its contacts, and assuming switch 4 to be in the position illustrated, the contacts $1^a$ and $1^b$ are connected in series across lines $L^1$ and $L^2$ through resistor $r$ as are also the capacitors 2 and 3, but the capacitors are short-circuited by the contacts of switch 1. Further assuming the capacitors 2 and 3 to be discharged and to be alike, deenergization of switch 1 will interrupt the short-circuits around said capacitors and if such short-circuits are opened simultaneously the capacitors 2 and 3 will be charged to the same degree. If, on the other hand, such short-circuits are opened progressively by non-simultaneous disengagement of contacts $1^a$ and $1^b$ the charges taken by the capacitors will differ and the difference between the final charges of the two capacitors will vary with the degree of departure from simultaneity of opening of contacts $1^a$ and $1^b$. Moreover the difference in charge of the capacitors will be lasting until both are discharged and in the event of non-simultaneous opening of contacts $1^a$ and $1^b$ the capacitor taking the higher degree of charge will be the one whose short-circuit is first opened by switch 1.

With the capacitors arranged to discharge in the directions indicated by the arrows it will be apparent that operation of switch 4 to bridge contacts 7—7 and 9—9 will subject the meter 10 to opposed currents, and assuming like charges of the two capacitors the needle of the meter remains stationary. This of course will indicate simultaneity of opening of contacts 1ª and 1ᵇ. If, on the other hand, the capacitors 2 and 3 take unlike charges the opposed currents through the meter 10 will become unbalanced and will deflect the needle of the meter in one direction or the other according to the direction of the preponderating flow of current. Thus deflection of the needle of the meter will indicate departure from the simultaneity of opening of contacts 1ª and 1ᵇ, whereas the degree of deflection of the needle will be indicative of the extent of departure from simultaneity of operation of contacts 1ª and 1ᵇ.

Experimentation has demonstrated such action of the circuit illustrated in Fig. 1 and the proportionality of the difference in values of currents supplied to the meter by the capacitors and the degree of departure of the contacts from simultaneity of opening has been determined.

Referring to the circuit shown in Fig. 2, the same is similar to that shown in Fig. 1 except for the type of instrumentalities employed. The capacitors 2 and 3 and resistor $r$ remain unchanged, wherefore they have been given the same reference characters. The switch 1 of Fig. 1 has here been replaced by cam operated switches 14 and 15 which it may be assumed are respectively operated by mechanisms to be held to operation in synchronism. The switch 4 of Fig. 1 has here been replaced by a switch 17 of the cam operated type to be caused to operate intermittently as desired. This switch has a single movable element 18 normally engaging contacts 19—19 and movable to disengage said contacts and to bridge contacts 20, 21 and 22. The meter 10 of Fig. 1 is here replaced by a polarized relay 25 having an armature 26 normally occupying the position from which it is movable in opposite directions selectively for selective control of corrective circuits not illustrated.

As in Fig. 1, the switches 14 and 15 control short-circuits for the capacitors 2 and 3, respectively, and the switch 17 in the position shown connects the capacitors in series across lines $L^1$ and $L^2$ similarly to the normally engaged contacts of switch 4 of Fig. 1. Contact 21 of switch 17 has a connection to the winding of polarized relay 25, which winding is also connected to a point X between the capacitors 2 and 3. The switch 17 when moved to bridge contacts 20, 21 and 22 completes a shunt for capacitor 2 including the winding of relay 25 and a shunt for capacitor 3 also including said winding and the capacitors discharge in opposite directions through said winding.

Thus it will be apparent that the circuit of Fig. 2 functions similarly to the circuit of Fig. 1, whereas it comprises means useable to control corrective circuits for the mechanisms with which the switches 14 and 15 are associated, for operation in or out of synchronism according to the operative relationship of such mechanisms.

What I claim as new and desire to secure by Letters Patent is:

1. In combination, a direct current supply circuit, series connected capacitors connected across said circuit, an electroresponsive device, connections through which said capacitors discharge to said device in an opposed relation for response of said device or inaction thereof depending upon the relative values of discharge of said capacitors, and individualized shunts for said capacitors, said shunts including closing and opening means and providing for equal or unequal charging of said capacitors depending upon the time relation of opening of said shunts thereby rendering the time relation of opening of said shunts a controlling factor for said electroresponsive means.

2. In combination, a direct current supply circuit, series connected capacitors connected across said circuit, individual shunts for said capacitors, means to open said shunts for charge of said capacitors, said means by opening said shunts simultaneously effecting like charges of said capacitors and by opening said shunts progressively effecting unlike final charges of said capacitors with a differential value varying with time lapse in progressive opening of said shunts, and means to measure the charges of said capacitors.

3. In combination, a plurality of sets of engageable and disengageable contacts, a plurality of series connected capacitors, connections individualizing said sets of contacts to said capacitors to make and open shunts therefor by engagement and disengagement of the contacts of said sets of contacts, a direct current supply circuit to which said capacitors are connected and by which said capacitors are charged to like or unlike final charges depending upon the time relation in which said sets of contacts are operated to open the shunts, electroresponsive means, connections through which said capacitors discharge in opposed relation to said electroresponsive means, and means for interrupting said current supply circuit and closing said discharge connections, thereby to subject said electroresponsive means to the influence of the final charges of said capacitors without resultant action of said electroresponsive means if said sets of contacts open the shunts simultaneously but with resultant action of said electroresponsive means if said sets of contacts open the shunts in a progressive manner, said electroresponsive means having selectivity of action according to which of said capacitors receives the greater final charge, and responding to varying degree according to the degree of difference between the final charges of said capacitors.

4. In combination, plural sets of contacts, like capacitors, an electroresponsive device, a direct current supply circuit, a control switch, circuit connections under the control of said switch connecting said capacitors to said supply circuit with said capacitors in series one with another, other circuit connections for said capacitors individualized thereto which connect each of said sets of contacts across one of said capacitors individualized thereto and connections which provide energizing connections from said capacitors to said electroresponsive device and through which said capacitors discharge to said device in opposed relation, the influence of said capacitors on said electroresponsive device varying with departures from simultaneity of operation of said sets of contacts and said device indicating the sequence of operation of said sets of contacts if not operating simultaneously.

5. In combination, a plurality of sets of engageable and disengageable contacts, a plurality of series connected capacitors, connections individualizing said sets of contacts to said capacitors to make and break shunts therefor by engagement and disengagement of the contacts of said sets of contacts, a direct current supply circuit to which said capacitors are connected and by which said capacitors are charged, an electroresponsive device, connections through which said capacitors discharge to said device in opposed relation, and means for interrupting said current supply circuit and closing said discharge connections for response or inaction of said device depending upon the time relation in which said sets of contacts are operated to commutate the shunts.

6. The method of ascertaining the order of opening of plural sets of contacts if they do not open simultaneously, which consists in connecting across each set of contacts one of a plurality of like capacitors, then while the sets of contacts are closed, connecting their respective capacitors in a series relation one with another to a direct current supply circuit and then opening the several sets of contacts and comparing the charges taken by the capacitors.

WILLIAM H. ELLIOT.

REFERENCES CITED

The following references are of record in the file of this patent:

UNITED STATES PATENTS

| Number | Name | Date |
| --- | --- | --- |
| 1,526,337 | Hartley | Feb. 17, 1925 |
| 1,765,585 | Herman | June 24, 1930 |
| 2,114,016 | Dimond | Apr. 12, 1938 |
| 2,144,873 | Dimond | Jan. 24, 1939 |
| 2,184,315 | Peters et al. | Dec. 26, 1939 |
| 2,347,497 | Neiswinter | Apr. 25, 1944 |